March 19, 1963 H. W. GRISWOLD ET AL 3,081,500
METHOD AND APPARATUS FOR PRODUCING APERTURED NONWOVEN FABRIC
Original Filed April 26, 1955 9 Sheets-Sheet 6

INVENTORS:
HECTOR W. GRISWOLD
GEORGE W. PEARCE
BY Schneider & Dressler
ATTORNEYS.

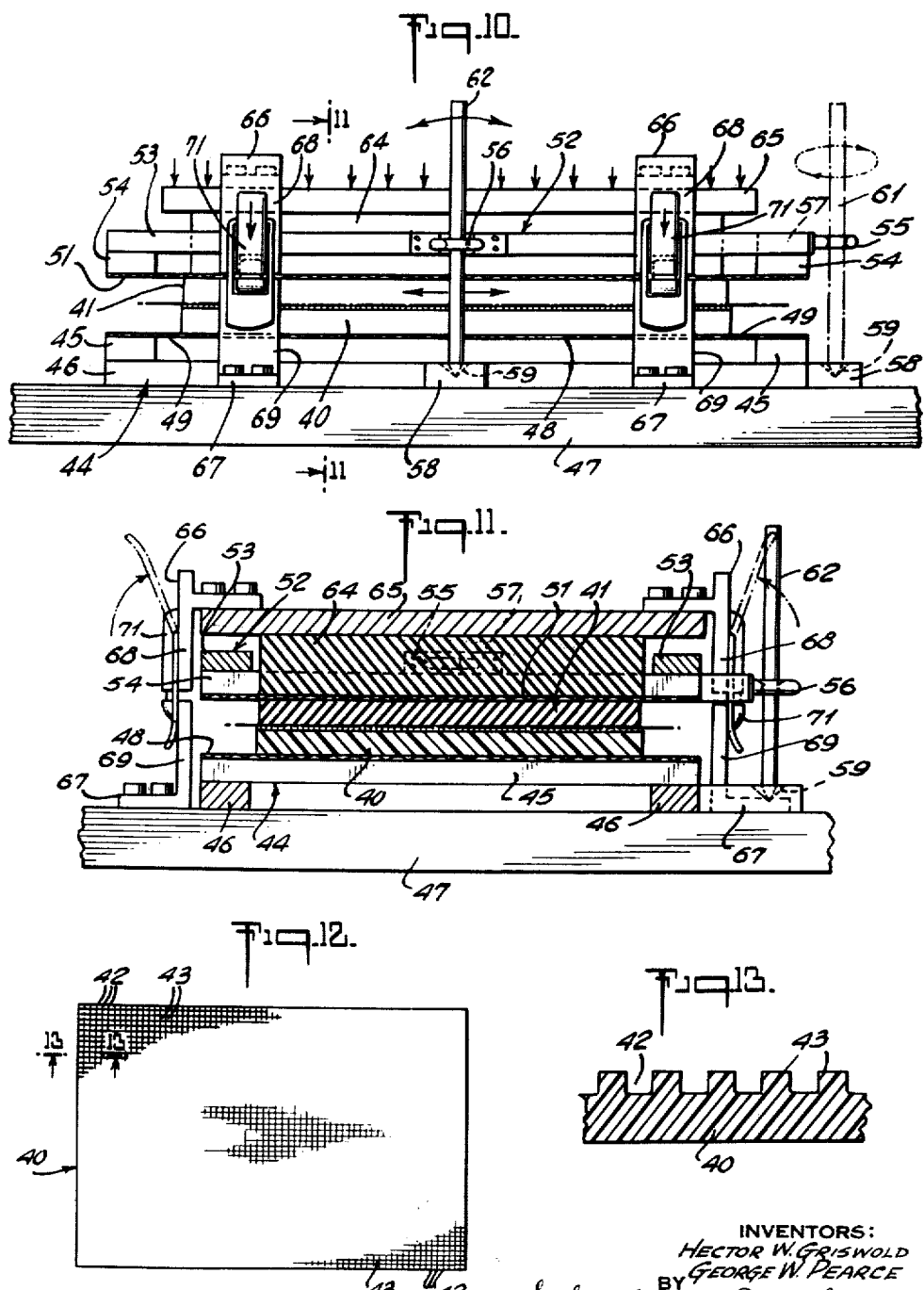

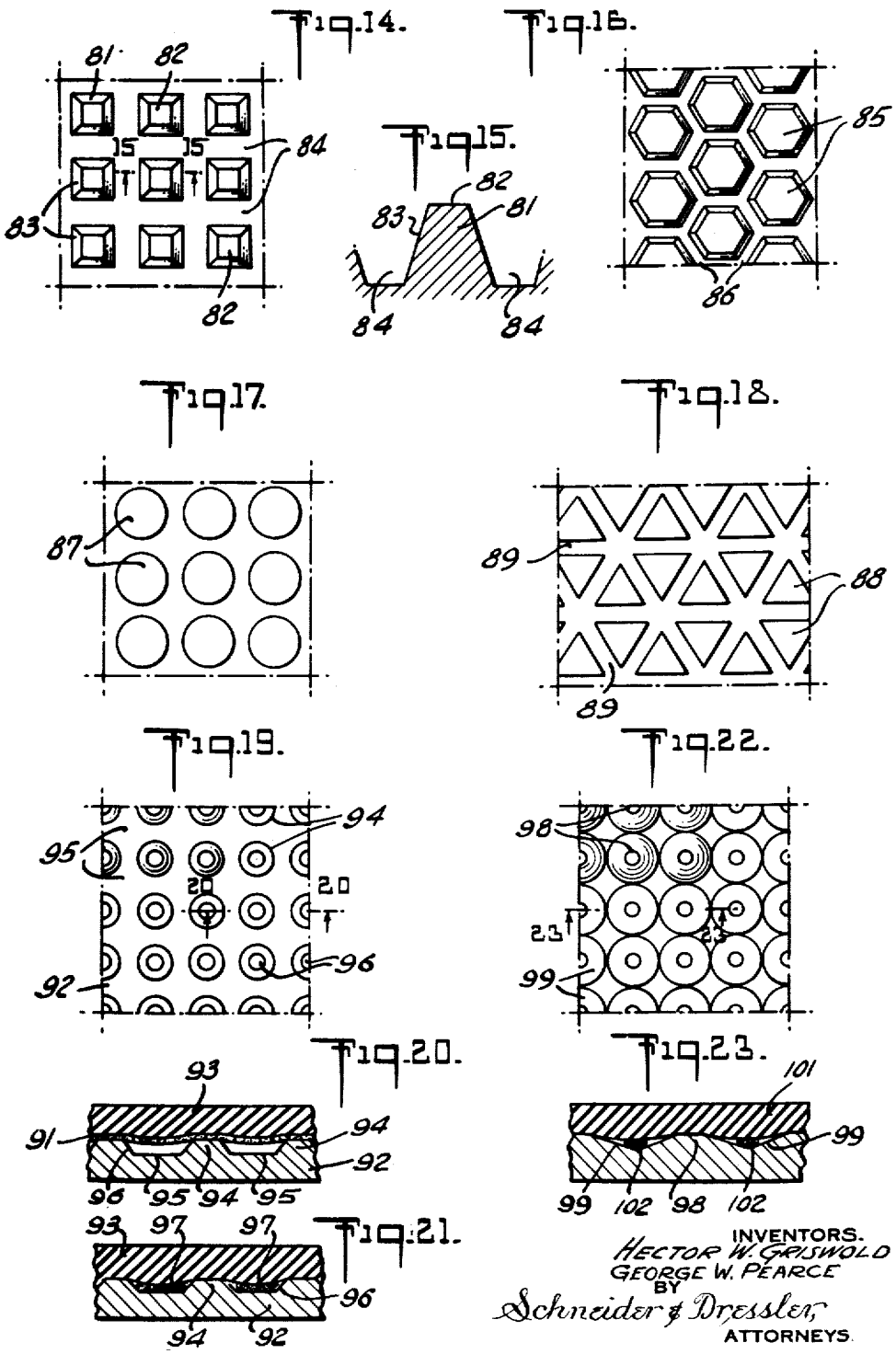

United States Patent Office 3,081,500
Patented Mar. 19, 1963

3,081,500
METHOD AND APPARATUS FOR PRODUCING
APERTURED NONWOVEN FABRIC
Hector W. Griswold, Longmeadow, and George W. Pearce, Danvers, Mass., assignors, by mesne assignments, to Johnson & Johnson, New Brunswick, N.J., a corporation of New Jersey
Original application Apr. 26, 1955, Ser. No. 503,872. Divided and this application July 27, 1956, Ser. No. 600,511
31 Claims. (Cl. 19—161)

This invention relates to textile fabrics, as well as means and methods for producing them, and is more particularly concerned with so-called "nonwoven" fabrics, i.e., fabrics produced directly from fibers without the use of conventional spinning, weaving, or knitting operations, and to the method and apparatus for making the same.

The present application is a division of our co-pending application Serial No. 503,872, filed April 26, 1955, which application was in turn a continuation-in-part of our co-pending applications Serial Nos. 437,037 (now abandoned) and 437,038, both filed June 16, 1954.

Heretofore, nonwoven fabrics have been essentially different in structure from fabrics which have been woven or knitted. In a woven or knitted fabric, the fibers of the material making up the fabric do not occur individually, but are twisted into yarns or threads which in turn are woven or knitted into the fabric. In the well-known spinning operation, fibers are spun or twisted together tightly into frictional and interlocking engagement with one another to form yarns which are substantially circular in cross section. It is these yarns, not the fibers acting individually, which serve as the structural members of the resulting woven or knitted fabrics. Generally speaking, these fabrics comprise reticular structures of intersecting, intertwining yarns which define interstices between them.

Nonwoven fabrics have been of two main types, felts and bonded webs. In each of these, the fibers making up the fabric occur individually and act individually as structural members. This is true even though the fibers in many felts are so highly interlocked and compressed together that it is difficult to identify individual fibers. Hat felts, for instance, are extremely dense, relatively "hard" fabrics without apparent interstices, which are quite dissimilar in appearance and qualities to woven or knitted structures. On the other hand, the fibers in bonded webs are usually flatly assembled in layers, more or less oriented in one direction, as in a card web; or arranged in a "random" manner, as in an air laid isotropic web. Various bonding agents have been used to print a binder pattern on such webs or to impregnate them to hold the individual fibers together. In this type of fabric, the fibers may remain relatively straight and overlapping one another with very little interlocking between them. They are usually arranged in a more or less uniformly spaced condition in the plane of the web, in such a way that only very small randomly occuring interstices are apparent between the overlapped fibers and those fibers between interstices remain spaced and more or less flatly arranged, possessing little similarity to the yarns of woven or knitted fabrics.

The present invention contemplates a nonwoven fabric wherein the fibers are arranged to define a predetermined pattern of holes or openings with most of the fiber segments bordering the holes extending in substantial parallelism with portions of their perimeters. In general, the fibers are oriented in interconnected groupings or web areas extending between the holes in a predetermined pattern corresponding to the aforementioned pattern of holes. The resulting fabric may be made to resemble a particular woven or knitted fabric. The groupings or groups are connected by fibers extending from one to another in such a way that they are common to a plurality of groupings. It is preferred that the average length of the fibers be considerably greater than the lengths of the groups containing them with the result that the groups predominantly comprise only parts or segments of fibers passing through them. Preferably the fibers average at least about ¼ inch in length or over and are textile-like in nature, i.e., flexible and distinct or unbeaten in the case of wood pulp. In general, the groupings are connected at junctures wherein the fibers extend in a plurality of diverse directions, while the fiber segments in the groups are relatively parallelized with respect to one another and more closely assembled than at the junctures. In one embodiment of a fabric according to this invention, the fiber segments in the groups are closely associated and substantially parallelized along the axes of the groups to the extent that the groups resemble spun yarns. The segments may be so closely arranged in overlapping relationship about the axes of the groups that the groups possess yarn-like thickness and are generally yarn-like in cross section.

In the foraminous structure formed by the interconnected fiber groupings the fibers lie in a state of mechanical equilibrium. The fibers are mechanically engaged, both frictionally and/or by interlocking of the fibers, to the extent that the arrangement of fibers is one of equilibrium. Generally speaking, the frictional engagement and interlocking between the fibers in the groupings, while contributing strength to the fabric, may be insufficient in itself to provide adequate tensile strength for many applications. Therefore, it may be desirable to strengthen the fabric in some way. For instance, an adhesive bonding material or binder may be applied by means such as printing or impregnation. As will be described more fully hereinafter, a binder may be contained in the web or layer of fibers from which the fabric is produced during and after its transformation into the fabric of this invention. However, even this binder may not be present in sufficient quantity and additional binder may be required to provide adequate strength.

Due to their structure and appearance and other qualities described in the foregoing paragraph, fabrics of this invention are particularly adapted for use in surgical dressings, absorbent dressings such as sanitary napkins and diapers, most suitably for covering sanitary napkins and diapers, in wiping cloths, toweling, filter materials, lining materials, industrial base fabrics, as a substitute for gauze and gauze-like fabrics in general, and a variety of other applications.

The present invention contemplates methods for producing the fabric of this invention from a base web or layer of fibers such as may be produced by carding, garnetting, air deposition, papermaking techniques, etc. These methods involve the application of external forces to such a web to move its fibers into groupings in fiber accumulating zones arranged in a predetermined pattern. Means comprising spaced projections defining interconnected grooves or spaces between them arranged in a predetermined pattern, may be employed for this purpose. External forces may be applied to the web to move the fibers it contains into the grooves or spaces between the projections. For instance, the web may be placed between molding means defining spaced projections and a cooperating resilient surface which may be oscillated slightly with respect to one another in the direction of the lay of the web to move the fibers away from the ends of the projections and into the spaces between them. The resilient surface may be presented by one side of a sponge rubber belt which first may constrain the fibers of the web in contact with the ends of the projections and then move them relative to the projections into the aforesaid spaces. The shape, size, and arrangement of the projections and correspondingly the shape, size, and arrangement of the openings in the resulting fabric and the arrangement of the fiber groupings between them may be varied to provide fabrics of different patterns resembling various woven and knitted and other fabrics such as gauze, buckram, marquisette, lace, etc.

Advantages of the invention other than those generally described above will be apparent from the following description and claims taken together with the drawings wherein:

FIG. 10 is a view in elevation of a device for producing a fabric according to this invention;

FIG. 11 is a view partly in section and partly in elevation along the line 11—11 of FIG. 10;

FIG. 12 is a plan view of the surface of the rearranging means of the device of FIG. 10;

FIG. 13 is an enlarged sectional view along the line 13—13 of FIG. 12;

FIG. 14 is an enlarged plan view of molding means comprising tapered projections;

FIG. 15 is a sectional view along the line 15—15 of FIG. 14;

FIG. 16 is a view similar to FIG. 14 of molding means comprising hexagonal projections with inclined sides;

FIG. 17 is a similar view showing molding means comprising round projections arranged in a square pattern;

FIG. 18 is a plan view of means comprising triangular projections;

FIG. 19 is a plan view of means presenting spaced frustro-conical projections;

FIG. 20 is an enlarged schematic sectional view along the line 20—20 of FIG. 19 showing a layer of starting material positioned between the ends of the projections and cooperating means also in section;

FIG. 21 is a view similar to FIG. 20 at a later stage in the process;

FIG. 22 is a plan view similar to FIG. 19 showing a somewhat different form of projections;

FIG. 23 is a sectional view similar to FIG. 20 along the line 23—23 of FIG. 22;

Figure 1:
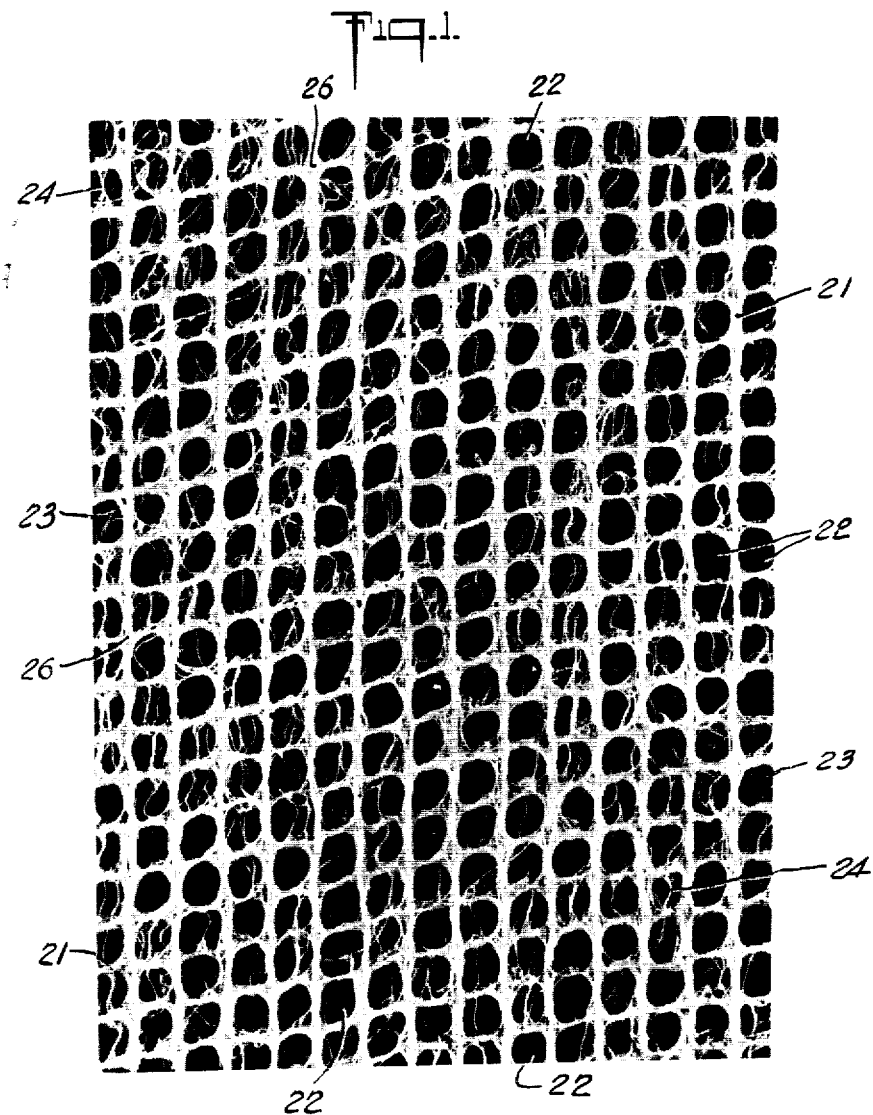
FIG. 1 is a photomicrograph of a typical nonwoven fabric according to one embodiment of this invention at an original enlargement of approximately 6 to 1.
Figure 2:
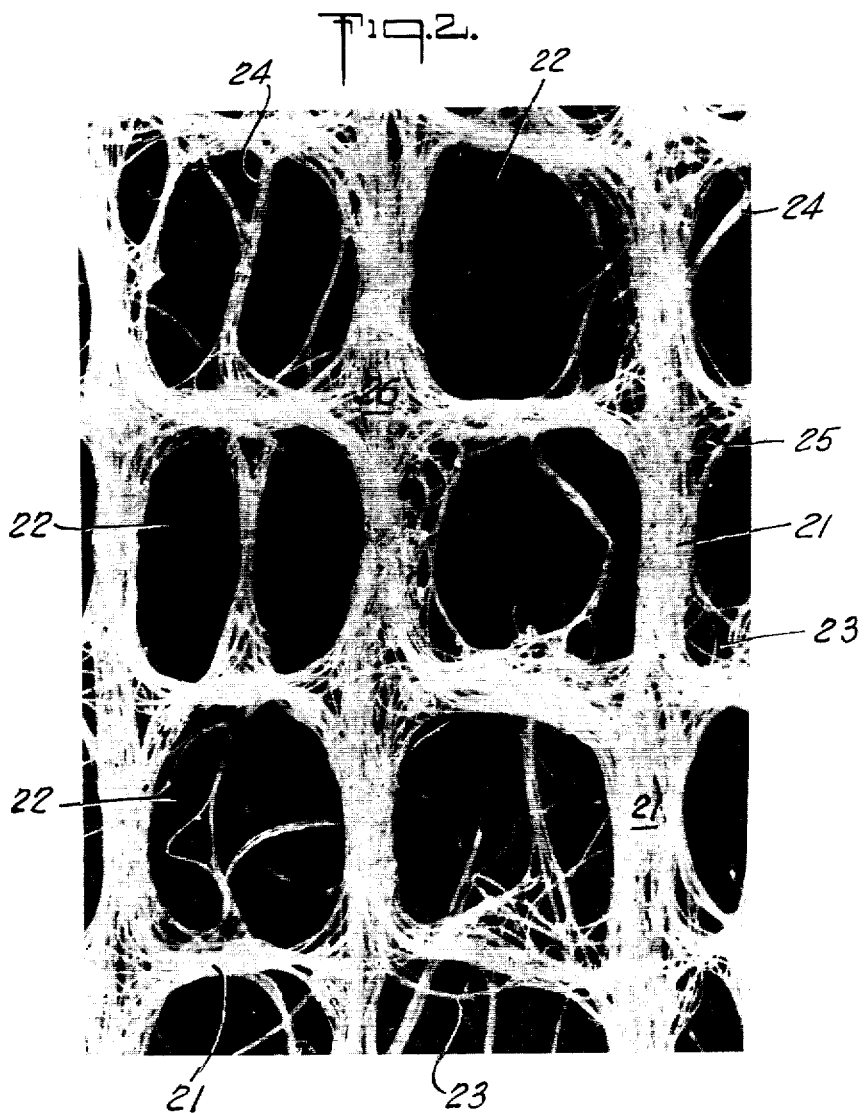
FIG. 2 is a photomicrograph of a portion of the fabric of FIG. 1 at an original enlargement of about 30 to 1.
Figure 3:
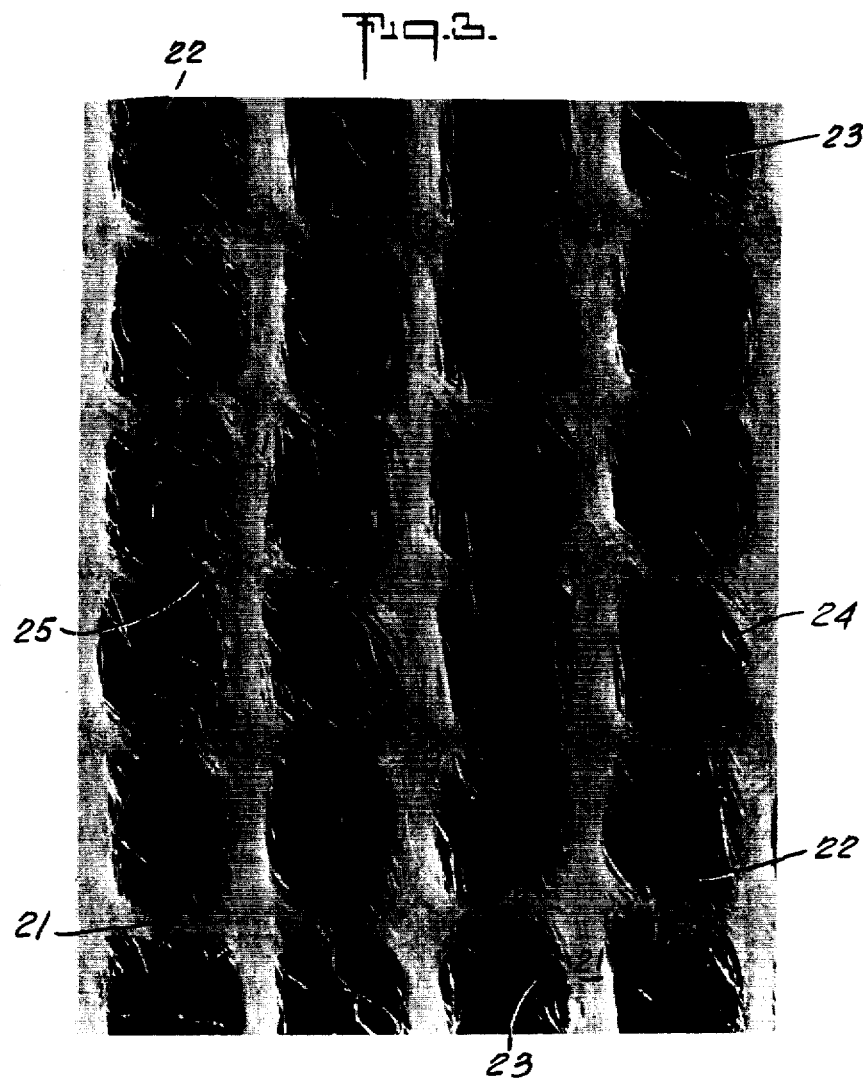
FIG. 3 is a photomicrograph of a similar fabric according to this invention at an original enlargement of about 24 to 1.

Referring to FIGS. 1, 2, and 3 of the drawings, there are shown typical portions of nonwoven fabrics according to one embodiment of this invention comprising interconnected yarn-like groupings or groups 21 of closely associated and substantially parallelized fiber segments. The groups are arranged in a definite pattern forming a gauze-like reticular structure wherein interconnected groups extend at substantially 90 and 180 degrees to one another. The fibers are quite closely associated in the groups with the result that the groups appear tight and adjacent groups define relatively distinct and "square" holes or openings 22 between them. The groups extending in the vertical direction in FIGS. 2 and 3 appear heavier and more tightly formed, probably because the fibers in the base webs from which these fabrics were produced were oriented predominantly in this direction. There appear to be a number of fiber segments 23 which lie outside the groupings and extend between them and some of these segments 23 may combine to form irregularly-located small groups 24 extending between the main groups 21. As shown more particularly in FIGS. 2 and 3, the groups 21 come together at junctures 26 where they are interconnected by fibers 25 which are common to more than one of the groups. The fibers passing through the junctures 26 are oriented in a plurality of diverse directions forming "diamond" shaped fiber areas which appear similar to highway intersections. Since it is difficult to distinguish the shape and arrangement of the individual fibers in FIGS. 1, 2, and 3, a more detailed description of this type of fabric will be reserved for the somewhat stylized version of FIGS. 6 and 7, described hereinafter.

Figure 4:
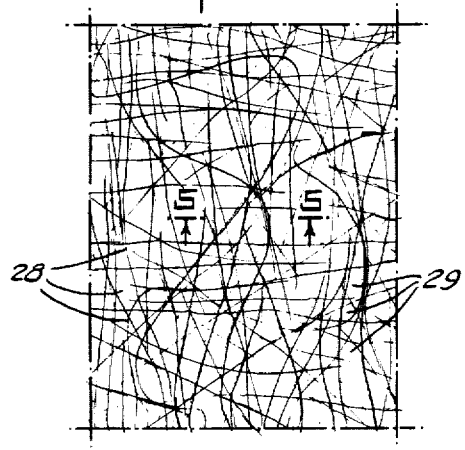
FIG. 4 is a schematic plan view of a typical base web from which the fabric of this invention may be produced.
Figure 5:
FIG. 5 is an enlarged cross sectional view taken along the line 5—5 of FIG. 4.

Referring to FIGS. 4 and 5, a nonwoven fabric according to one embodiment of this invention may be produced from a base web of flexible fibers 28 arranged in substantially nonoriented, overlapping, intersecting relation with one another, such that there is only slight entanglement between them. The fibers in the web are flatly assembled in nongrouped relationship with one another, such that they define only relatively small interstices 29 between them. The web may contain a small percentage of a uniformly dispersed moisture softenable adhesive binder to assist in maintaining the web integrity as it is subjected to forces designed to cause its fibers to be rearranged into a fabric according to this invention.

Figure 6:
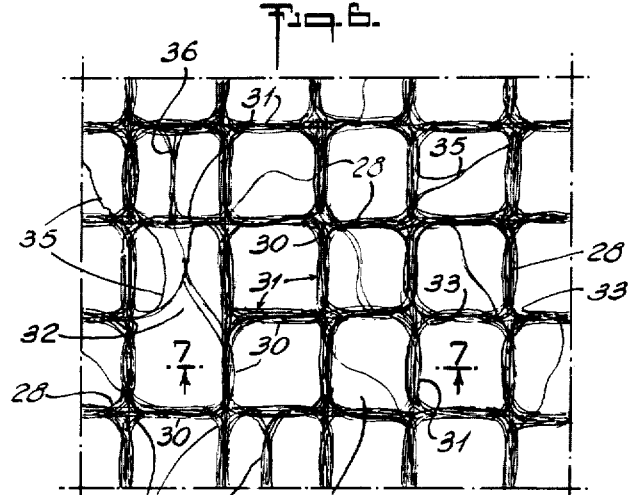
FIG. 6 is a schematic plan view of the web of FIG. 4 after it has been rearranged to produce a fabric typical of one embodiment of this invention.
Figure 7:
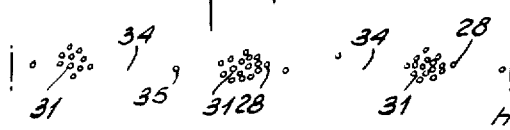
FIG. 7 is an enlarged sectional view taken along the line 7—7 of FIG. 6.

In FIGS. 6 and 7, there is shown a fabric of this invention produced from the above-described base web, wherein the fibers 28 are bent and arranged in a gauze-like reticular structure of interconnected groupings 31 of fiber segments. The groups 31 extend at approximately 90 and 180 degrees to one another and, except where there is an irregularity in the fabric, as at 32 in FIG. 6, four groups come together at each juncture 33 wherein the fibers are oriented in a plurality of diverse directions. Some fibers from each of these four groups pass into each of the other groups at the juncture with the result that the groups are connected by fibers common to a plurality of groups. The individual fibers may be considerably longer than the groups containing them with the result that each fiber may extend through a plurality of interconnected groups and each of the groups may contain only a portion or a segment 30 of each of the fibers passing through it. The fiber segments may be closely associated and substantially parallelized about the longitudinal axes of the groups to the extent that the segments in the groups appear to be in substantial contact with one another along their length when viewed by the naked eye or under a microscope at low magnifications. The individual fibers may pass from one group and enter a given juncture into any one of the other three groups entering the same juncture. Thus, they may either extend substantially straight or take 90 degree turns into the groups interconnected at these angles. Although the bends in the fibers may be due to their presence in groups interconnected at right angles to one another, the fibers curve as they bend to pass from one group to another. The tighter the groups are formed, the sharper will be the bends in the fibers and the shorter will be their radii of curvature. The fibers may extend through a more or less symmetrical set of groups in such a way that they will be sinuous in shape. However, the fibers may wander throughout the groups turning back on themselves and adopting irregular configurations. The paths of typical individual fibers 28 are shown in heavy lines in FIG. 6.

The resulting groups 31 of fiber segments 30 may possess yarn-like thickness. The fiber segments may be substantially parallelized and closely arranged about the longitudinal axes of the groups to the extent that the groups are yarn-like in cross section. As shown in FIG. 7, the groups 31 possess yarn-like thicknesses in two dimensions, both in the plane of the web and perpendicular thereto, and tend to be oval in cross section. The fibers in a given cross section of the fabric of this invention may appear closely assembled in the groups 31, in such a way that there appears to be a good deal of contact between them. The spaced groups define enlarged holes 34 between themselves similar to the interstices between the yarns of a conventional woven gauze. Most of the fiber segments bordering the holes extend in substantial parallelism with corresponding portions of their perimeters. That is to say, they extend around the holes and do not present ends adjacent their perimeters. In general, the tighter the groups are formed, the more clearly defined will be the voids between them. The size of the holes 34 will depend to a large extent upon the means employed to produce the fabric of this invention, as will be described hereinafter. As mentioned hereinbefore in connection with FIGS. 1, 2, and 3, there may be a certain percentage of fiber segments which will fail to enter the main groups and will extend between them as random segments 35 or relatively small random bundles 36. However, in general the openings 34 may be described as being substantially free of fibers.

Figure 8:
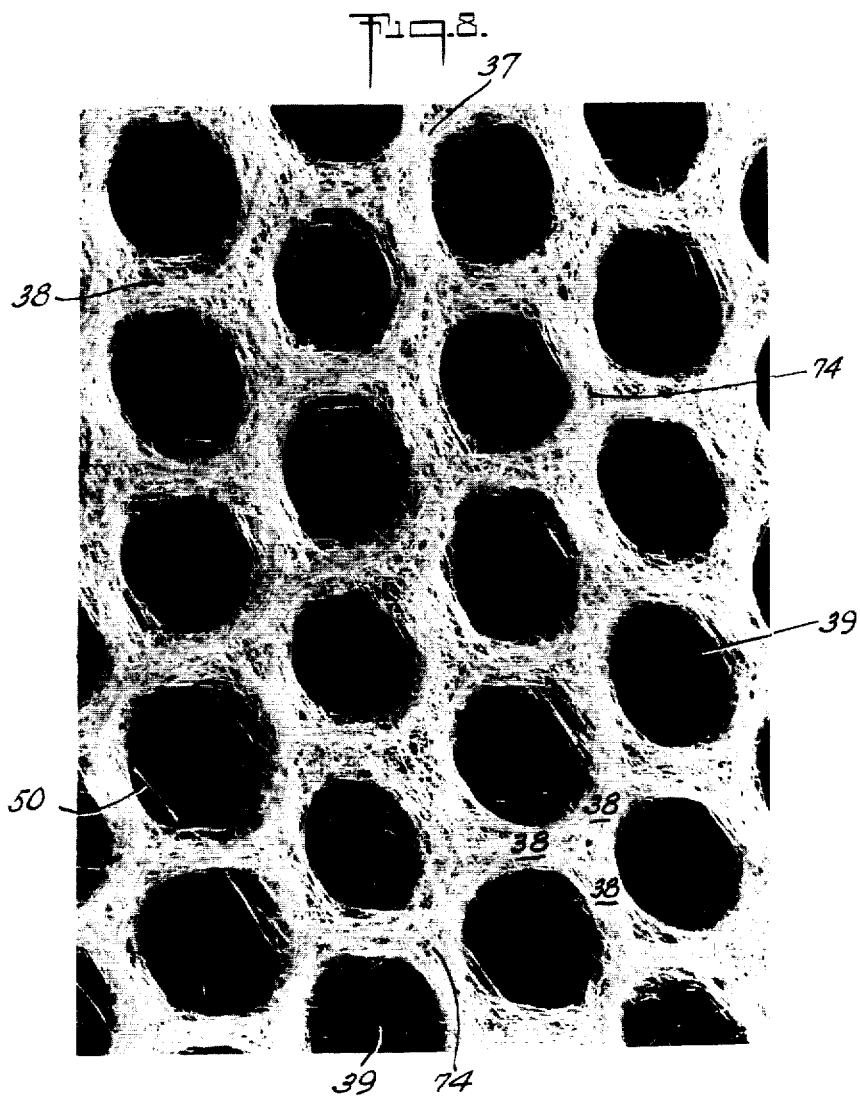
FIG. 8 is a photomicrograph of a somewhat different fabric according to this invention at an original enlargement of about 14 to 1.
Figure 9:
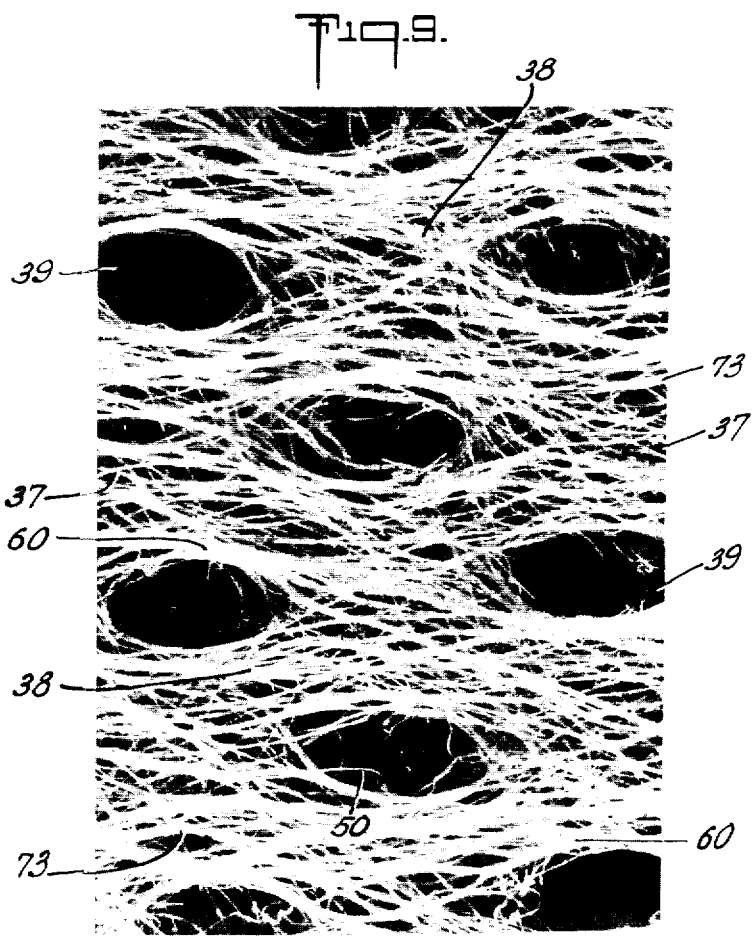
FIG. 9 is a photomicrograph of still another fabric at an original enlargement of approximately 30 to 1.

Referring to FIGS. 8 and 9 of the drawings, there are shown porous nonwoven fabrics comprising fibers 37 arranged in interconnected fiber groupings or web areas 38 defining holes or openings 39 arranged in predetermined patterns in the fabric. The holes 39 are distinct and substantially free of fibers passing through them. However, a certain number of random fiber segments 50 may remain extending through the openings without detracting materially from the porosity of the fabric or the clarity of hole formation. Most of the fibers or fiber segments bordering the holes extend in substantial parallelism with portions of the perimeters of the holes. That is to say, they extend around the holes and do not present ends adjacent their perimeters. As shown more particularly in FIG. 9, the holes may be bordered by smaller groups 60 of fiber segments wherein the fibers are more closely assembled than in the remaining areas of the fabric between holes. However, the fiber arrangement across the areas 38 between holes may be substantially uniform in density as appears to be the case in many areas of FIG. 8.

The fiber groupings or areas 38 between holes may contain a multiplicity of much smaller interconnected groups 73 of fiber segments, as shown to an extent in FIG. 9. In FIG. 9, it appears that a large percentage of the fibers in the areas between holes 39 have lost their identity as individual fibers and merged with other fibers forming a network of interconnected groups or strands 73 of highly parallelized fiber segments. As illustrated, particularly in FIG. 8, the main fiber groupings 38 may be interconnected at junctures 74 wherein the fibers extend in a pluraltiy of diverse directions. The fibers in the groupings 38 extending between the junctures 74 in FIG. 8 are more parallelized and appear more closely assembled than at the junctures. However, they are not as closely assembled and parallelized as the fiber segments in the groupings 21 of FIGS. 1, 2, and 3. Most of the fibers in FIGS. 8 and 9 are considerably longer than the greatest dimension of the holes which they define with the result that they may extend around or pass several holes extending in different directions from grouping to grouping. Thus, the fibers may be shaped or bent to conform to the reticular structure in which they lie.

In the fabric of this invention, the fibers are in mechanical engagement with one another to the extent that the fabric structure is in mechanical equilibrium. The fibers are in frictional engagement with one another and their bent or curled configurations are entangled or interlocked and resist separation. In general, the firctional engagement and interlocking between the fibers is greater when they lie in interconnected yarn-like groups of fiber segments. In other words, both frictional engagement and interlocking are a function of the tightness or looseness of the fiber groupings. The closeness of the segments tends to constrain the fibers in the groups and the bends in the fibers tend to prevent their movement along the axes of the groups. Obviously, the longer the fibers, the more segments there will be in frictional engagement and the more bends or curls will be entangled. Thus, fabric strength is a function of fiber length as well as other variables. If a binder is present in the base web, a certain amount of it may become effective to a certain extent to hold the fibers in their new positions in the groupings. The effective binder may assist in holding the fibers in close contact with one another and may concentrate within the groups themselves, to assist in holding them together.

As mentioned hereinbefore, the starting material for the nonwoven fabric of this invention may be a layer of fibers 28 arranged in overlapping intersecting relation with one another, such that there is only slight entanglement between them, as shown in FIGS. 4 and 5. Webs of this type may be formed by carding, by air deposition, by liquid deposition such as in a paper making process, etc. They may be formed in a single layer or by laminating a plurality of webs formed by these techniques. The fibers in the base web may be arranged in a random manner or more or less oriented, as in a card web, or a card web laminate. The individual fibers may be relatively straight or slightly bent, occurring independently in the web in nongrouped intersecting relation with one another. They may intersect at various angles to one another such that, generally speaking, adjacent fibers only come into contact at the points where they cross. The overlapping, intersecting fibers form interstices 29 between them which vary in size with the fiber density of the web such that for preferred web weights of from 100 to 600 grains per square yard, only very small interstices are apparent. Webs ranging in weight from below 100 grains per square yard to the neighborhood of 2,000 grains per square yard may be rearranged into the fabric of this invention. Such webs may be held together by virtue of the mechanical engagement, i.e., the frictional contact and the aforementioned slight entanglement, between its fibers, as well as by any binder which may be present. Generally speaking, the fibers lie in mechanical equilibrium in the web or layer.

A web or layer of fibers, such as described above, may be subjected to external forces applied in a predetermined pattern. The patterned application of forces will cause portions of the fibers in the layer to move from corresponding areas thereof into fiber accumulating zones surrounding these areas. The newly positioned fibers are in a new state of balanced equilibrium and will define holes or openings in the fabric arranged in accordance with the aforementioned pattern, as seen for example in FIG. 6. In the movement of the fibers into closer proximity with one another to produce a fabric as shown in FIG. 6, the external rearranging forces applied to the fibers will ordinarily include lateral translatory components acting parallel to the plane of the web and other cooperating components of force causing individual fibers to move, with respect to other fibers in the layer with which they overlap and are frictionally engaged, into mechanical equilibrium in the most extreme lateral position into which they are moved, as shown in FIG. 6, by the rearranging forces.

During the application of external forces, sufficient local support must be provided for preventing these forces from destroying the web integrity, i.e., from pulling the layer apart or from converting it into mere groups of fibers, etc. The supporting means employed must allow the fibers to move during the application of these forces to the extent that they may assume positions in mechanical equilibrium in the fabric. The fibers may be said to be in mechanical equilibrium in the fabric when the frictional engagement and interlocking between them hold them together.

An adhesive binder may be included in the web before its rearrangement into a fabric according to this invention to provide local support and to facilitate web handling. However, such a binder may not be necessary, particularly when the web is fully supported by external means. A binder may be included in the web during its formation, in the case of a wet-formed web, for instance, or it may be added by impregnation, spraying, or other such means. In order that the fibers in the web may enter into the fabric structure, they must be free to move to a certain extent locally with respect to one another, as described hereinbefore. This means that the binder should be rendered sufficiently soft or plastic during the application of these forces, to allow this movement. A solvent or softening agent such as water may be added to the web for this purpose when the web contains a binder which may be softened in this way.

It is preferred that some liquid, such as water, be uniformly distributed in the web to assist in parallelizing fiber segments and bringing them into close association in the groups. The web may be wet to contain a maximum of water, for instance, prior to the application of bundling forces, although in general, less water, in the neighborhood of 50 to 250 percent moisture, is preferred. The term "percent moisture" above, and when used in the following specification and claims, refers to percentage of moisture by weight of the dry web. Most fibers will absorb moisture, swell, and soften to a certain extent while retaining this moisture, such that if moistened fibers are brought together, they will tend to conform and fit closely with one another. As the fibers swell and soften under the influence of moisture, they may become nonresiliently bendable to the extent that they may be bent or curled to conform to the grooves and will retain their new configurations in contact with the other fibers. It is believed that the surface tension effect of the moisture in the grooves tends to move the fiber segments in the grooves closer togther and into parallelism in the groups. Once the fibers are brought into alignment, the surface tension of the moisture tends to hold them there. The intensity of this effect will depend upon the amount of liquid present in the web. While good results may be obtained in accordance with the methods of this invention when the web contains 50 percent moisture, for instance, the above-mentioned surface tension effect should be greater with higher moisture contents.

In FIGS. 10 through 13, there is shown an illustrative device for producing a fabric according to this invention. A fibrous web, not shown, of the type described above, may be placed between a grooved molding member 40 and a resilient block 41 which are adapted to be oscillated with respect to one another along their plane of contact to cause the fibers in the web to move into the grooves of the molding member and form a fabric of predetermined pattern according to this invention. The surface of the molding member 40 presents a pattern of closely spaced intersecting grooves 42. As shown in FIGS. 12 and 13, the grooves or fiber accumulating zones intersect at right angles to one another and are spaced equally in the longitudinal and transverse directions of the molding member such that they define square raised portions or projections 43 between them. Since the fiber rearranging forces resulting from relative movement of grooved molding member 40 and resilient block 41 are applied only to the tops of raised portions 43, fiber accumulating zones 42 between the raised portions are substantially free of all translatory and other applied forces. The grooves 42 may be substantially square in section and spaced from one another by an amount approximately equal to their width with the result that a sectional view through the molding member has a square toothed appearance. The molding member 40 may be of any suitable material which is sufficiently strong and will resist the wear and corrosion incident to its use. Polymethylmethacrylate, hard rubber, corrosion resistant metals and other similar materials will give good results. The resilient block 41 may comprise any suitable resilient material such as sponge rubber, for example.

As shown in FIGS. 10 and 11, the molding member 40 is supported by an open frame 44 comprising a pair of transverse bars 45 connecting the ends of a pair of spaced longitudinal bars 46. The longitudinal bars are fixed to a suitable support, such as a table 47, and the mold 40 is resiliently secured to the transverse bars 45 which are separated by a distance slightly greater than the length of the mold 40. The molding member is attached to a layer of resilient material 48, such as woven metal screening, which in turn may be extended and secured at its ends to the transverse bars 45. Those portions 49 of the resilient layer 48 between the ends of the molding member 40 and the transverse bars 45 are free to flex slightly to provide resilient support for the mold. The resilient block is similarly supported in an inverted fashion by a similar open frame. The resilient block 41 is attached to a resilient screen 51 which is secured to a frame 52 comprising longitudinal bars 53 and transverse bars 54 joined to form a structure corresponding to that of the aforementioned frame 44 supporting the molding block 40.

In order to oscillate the resilient block 41 and the molding member 40 with respect to one another to cause the fibers to move into the grooves of the mold, eyes 55 and 56 are provided on one end and one side, respectively, of the upper frame 52, extending outwardly therefrom. One of the eyes 56 is secured directly to the side of the frame and the other is secured to the frame through a block 57 which is attached to the upper surface of one of the end bars 54, thereby placing the two eyes on the same level. Fittings 58 containing recesses 59 vertically aligned with the normal position of the eyes are fixed to the table 47 outside of the lower frame 44. Levers 61 and 62, such as steel bars, for moving the upper frame with respect to the lower frame may be inserted through the eyes with their lower ends seated in the aforementioned recesses 59. Oscillatory motion is imparted in the longitudinal direction by grasping the upper end of the end lever 61 and moving it back and forth steadily in a longitudinal direction, and transverse oscillation may be achieved by operating the side lever 62 transversely in the same manner. The fibers of the web may be pushed into the grooves of molding member 40 by the relative motion of members 40 and 41 produced by such oscillation and the resulting lateral translatory components of force acting parallel to the plane of the web. In addition, they may be rolled into closer contact by the rotational components of force applied, through the relative motion of members 40 and 41, to the fibers confined between the oscillatory members. These rotational components of force will help to cause individual fibers to move with respect to other fibers in the web with which they overlap and are frictionally engaged. In addition, the vibrational components of force caused by vibration of the moving parts of the apparatus shown in FIGS. 10 through 13, which may include vertical components, will also assist in producing the aforesaid fiber motion.

Clamping means are provided in order to hold the resilient block 41 firmly upon the grooved surface of the molding member 40. These means comprise a resilient pressure distributing block 64 which may be of the same material as the first resilient block, a clamping plate 65 for pressing downwardly upon the upper surface of the pressure distributing block, and releasable clamping means attached to the clamping plate 65 and the table 47 for holding or clamping the plate in position with respect to the table. The pressure distributing block 64 rests within the upper frame 52 upon the wire screen 51 supporting the resilient block, while the clamping plate 65 presses down upon the upper surface of the block with the clamping means extending from the plate to the table on either side of the upper and lower frame. The clamping means comprises pairs of spaced T-shaped members 66 attached to opposite sides of the clamping plate and corresponding pairs of spaced angle feet 67 secured to the table 47 on opposite sides of the lower frame 44. Corresponding legs 68 and 69 of the T-shaped members 66 and the clamping feet 67 extend downwardly and upwardly, respectively, towards each other on either side of the molding unit. Co-acting parts of luggage-type clamps 71 are attached to these legs to clamp the plate 65 to the table 47. The clamps 71 are located adjacent opposite ends of the molding member 40 in order to assure that pressure exerted upon the resilient block 41 through the above described clamping means will be distributed fairly uniformly over the mating surfaces of the molding member and the resilient block 41.

The resilient block 41 may be oscillated alternately lengthwise and crosswise by alternate operation of the end and side levers 61 and 62, or it may be oscillated in only one direction by the use of the appropriate lever. Alternate operation is advantageous since it aids effective grouping and the production of more uniform groups. The benefits of alternate operation may be attained to some extent by swinging the end lever 61, for instance, back and forth in a circular path to oscillate the block 41 alternately lengthwise and crosswise in a circular path. Portions or segments of a certain percentage of the fibers in the starting web may not move into the grooves 42 of the molding member and may extend across the raised portions 43 of the molding surface between the fiber groupings lying in the grooves. More than one of such random segments may come together to form a small random group extending between the main groups. The alternate operation tends to minimize the occurrence of such random segments or groups. For example, when the raised portions 43 are approximately 1/32 inch wide, oscillation of the upper frame 52 in a circular path having a diameter of approximately 1/4 inch at approximately 180 cycles per minute for relatively short periods of time, say in the order of about 10 seconds or even less, will provide a fabric according to this invention. Since a substantial portion of the oscillatory motion of the frame 52 will be absorbed by the flexure of the resilient material in the block 41, it is difficult to determine the exact amplitude of oscillation of the surface of the resilient block 41 in contact with the web in the above example. It is preferred that the amplitude of oscillation of this surface at least be equal to the individual widths of the raised portions 43 in order to push the fibers overlying these portions into the grooves 42.

FIGS. 14 through 18 illustrate various groove patterns or patterns of projections for the molding member which will produce openings and cause fiber groupings to be produced in corresponding patterns in the fabric of this invention. The square pattern of FIGS. 12 and 13 may be modified somewhat, as shown in FIGS. 14 and 15 which illustrate projections 81 with square ends 82 having inclined side surfaces 83 defining grooves 84 between them. The tapered projections 81 facilitate the removal of the fabric from the molding member as well as aiding in its production. FIG. 16 illustrates the use of hexagonal projections 85 to define grooves 86 arranged in a reticular pattern wherein three grooves interconnect at 120 degrees to one another. A molding surface of this type will cause a similar arrangement of interconnected fiber groupings. The hexagonal raised portions may be tapered for the reasons mentioned above in connection with FIG. 14. FIG. 17 illustrates a molding surface having cylindrical projections 87 while FIG. 18 illustrates projections 88 which are triangular. The triangular projections of FIG. 18 are arranged in such a way as to define a pattern of grooves 89 wherein six grooves interconnect and extend at 60 degrees to one another.

Referring to FIGS. 19 through 21, there is illustrated a method and means for producing a fabric according to this invention. A base web or fibrous layer of the type described hereinbefore may be placed in an open position between hole defining means 92 below the web and web engaging means 93 above it, which are adapted to oscillate to a limited extent with respect to one another in the plane of the web for producing a porous nonwoven fabric. The hole defining means 92 may comprise a multiplicity of spaced projections 94 arranged in a definite pattern on a member presenting a continuous surface 95 between projections. The projections 94 may be in the form of small nobs, conical frustums or similar protuberances, preferably having side surfaces 96 which are inclined toward the continuous surface 95 of the hole defining member 92. The projections may be arranged in a pattern corresponding to the pattern of holes desired to be produced in the resulting fabric. As shown in FIG. 19, the projections may be uniformly spaced and arranged in a "square" pattern. The web engaging member 93 preferably comprises a resilient surface such as that presented by one side of a sponge rubber belt.

As shown schematically in FIG. 20, the web may be placed between the hole defining member 92 and the web engaging member 93 and the members may be brought together to support the web between the ends of the projections 94 and the inner surface of the web engaging member 93. Preferably, the web is supported under pressure at least to the extent that the ends of the projections 94 and the surface of the web engaging member 93 would be in contact were it not for the web between them. The members then may be oscillated slightly with respect to one another such that the motion of the web engaging member 93 with respect to the projections 94 will cause those portions of the fibers originally passing over the projections to move away from the ends of the projections. As shown in FIG. 21, the projections 94 then may contact the surface of the web engaging member 93, and the web 91 may be supported by the inclined sides 96 of the projections and the surface 95 of the hole defining member 92. Preferably, the web engaging member presents a surface which is relatively rough compared with the surfaces of the projections since it is desirable that the web enter into greater frictional contact with this member as compared to the projections so that the web will tend to move more with the surface of the web engaging member 93 than with the ends of the projections 94 during the aforesaid oscillation.

The motion of the web 91 relative to the ends of the projections 94 tends to bend and rearrange those portions of the fibers passing over the projections in new positions in mechanical equilibrium adjacent the edges of the projections, thereby producing holes in the web in the way of the projections. As described hereinbefore, the rearranged fibers retain their new configurations, frictionally engaged and interlocked with proximate fibers to define relatively distinct and permanent pores or holes in the fabric. The size and shape of the holes produced will depend to a large extent upon the size and shape of the projections 94, although the holes may be elongated in the direction of orientation of the fibers in the base web, as shown in FIG. 9.

It is preferred that the web engaging member 93 be of resilient material so that it will fit over the ends of the projections 94 and protrude slightly into the spaces between them when the web engaging member 93 and the hole defining member 92 are brought together as aforesaid. When the members are oscillated with respect to one another while holding the web with this sort of resilient interfitting between them, the fiber segments in the way of the projections 94 will be moved away from the ends of the projections and urged into the spaces or fiber accumulating zones between them by the protruding portions 97 of the resilient member 93. The resilient web engaging member also may move the fiber segments downwardly along the inclined sides 96 of the projections to produce holes larger than otherwise would be produced if a resilient member is not employed. A fabric may be produced by relative oscillation of the members 92 and 93 in one direction, or in different directions in the plane of the web.

As shown in FIGURES 22 and 23, projections 98 may be closely spaced and designed with shallow inclined sides 99 to give relatively tight group formation with relatively short projections. The short inclined projections 98 will slowly work their way into the web and the protruding portions of a cooperating resilient member 101 may be employed to move fibers away from the ends of the projections 98 and down their sides until relatively tight groups 102 of fibers are formed in the fiber accumulating zones around the bases of the projections.

Figure 24:
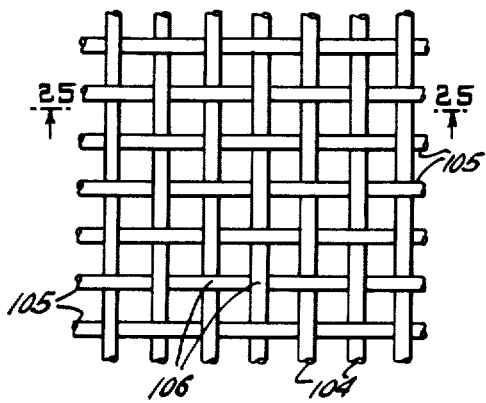
FIG. 24 is a plan view of a woven screen rearranging means according to this invention.
Figure 25:
FIG. 25 is a view partly in section and partly in elevation along the line 25—25 of FIG. 24.

Another type of hole defining member is illustrated in FIGS. 24 and 25 wherein a screen of interwoven wires is employed to define the pattern of holes desired. This screen may be woven with the wires 104 in one direction remaining relatively straight while the wires 105 in the other direction are crimped. A pattern of spaced projections is formed by those portions 106 of the crimped wires 105 which form alternate intersections with the relatively noncrimped wires 104. These projections are relatively blunt and oblong and have sides inclined in the direction of the crimped wires, with the result that they tend to produce slightly oblong holes when oscillated with respect to a resilient web engaging surface. Those portions of the crimped wires 105 between projections cooperate with the "noncrimped" wires 104 to substitute for the continuous surface 95 of FIGS. 19 through 21 to provide means for supporting the web after penetration by the projections.

Figure 26:
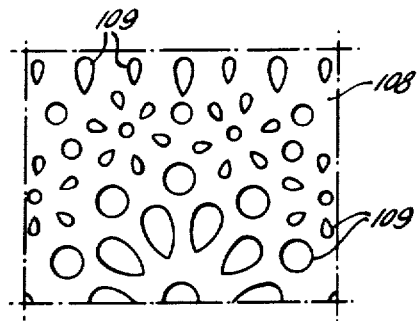
FIG. 26 is a plan view of means comprising specially shaped projections arranged in a lace-like pattern.
Figure 27:
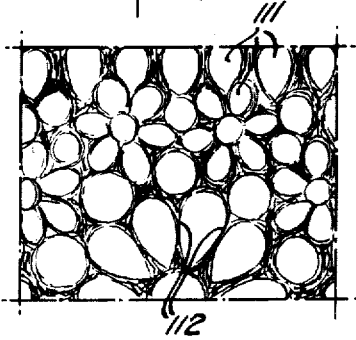
FIG. 27 is a plan view of a fabric produced employing the means of FIG. 26.

Still another form of hole defining member 108, which may be used in the same manner as the hole defining members illustrated in FIGURES 13–25, is shown schematically in FIGURE 26. The member 108 comprises spaced irregularly shaped projections 109. These projections are shaped and arranged in a pattern resembling the holes in a lace. In FIGURE 27 there is illustrated a lacy nonwoven fabric, produced on the member 108, which comprises holes 111 shaped and arranged to correspond to the projections 109. This fabric comprises closely assembled fibers arranged in interconnected groups 112 of fiber segments. The groups 112 define the holes 111 between them.

Figure 28:
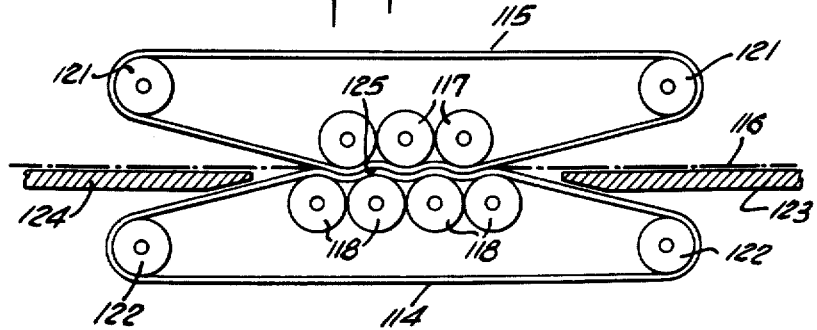
FIG. 28 is a schematic view partly in longitudinal section of another device for producing a fabric according to this invention.

As shown in FIG. 28, the hole defining or fabric producing member and the fabric engaging member may be in the form of continuous moving belts 114 and 115, respectively, in which case they may be urged together with a web 116 between them and oscillated with respect to one another by means contacting their opposite surfaces as they move along. As suggested previously, the fabric engaging belt 115 may be of sponge rubber or a similar resilient material which will resist the continuous wear and flexure it must withstand. The hole defining member may comprise a hard rubber or any other suitable hard material, when in the form illustrated in FIGS. 14 through 23, or it may comprise a relatively flexible sheet of material with inserts of relatively hard material forming the projections. The screening of FIGS. 24 and 25 also may be in the form of a continuous belt.

The belts 114 and 115 with the web 116 between them may be passed between sets of upper rollers 117 and lower rollers 118 designed to be oscillated axially, or axially and circumferentially, with respect to one another in a manner such as described in U.S. Patent No. 2,093,709 or 2,506,855, both disclosing machines, and mechanisms for machines of the continuous felting type. As explained in U.S. Patent No. 2,093,709 (page 4, column 2, lines 3–5), the rollers "are subjected to a circumferential vibration which is superposed upon the movement of rotation." Thus a given point on the surface of a roller continues to advance generally because of the roller's rotation even though at any particular moment it may be moving backwards within a narrow angular distance because of the circumferential vibration or oscillatory movement of the roller. The resilient belt 115 may pass around the upper rollers 117 and guide rollers 121 at the front and the rear of the upper rollers, and the hole defining belt 114 may pass around the lower rollers 118 and guide rollers 122 at the front and the rear thereof. The upper and lower guide rollers may be spaced to cause the upper and lower belts to converge as they move toward the oscillating rollers and diverge as they leave these rollers.

The web 116 may enter between the belts 114 and 115 where they converge at the front of the oscillating rollers and leave them where they diverge at the rear of these rollers. Suitable tables 123 and 124 may be provided for supporting the web 116 adjacent the points where it enters and leaves the belts. The rollers 117 and 118 may oscillate axially or circumferentially relative to one another while they continue to rotate to feed the superimposed belts 114 and 115 between them at an economical production rate. The upper and lower sets of rollers may be spaced or urged together in such a way as to press the resilient belt and the web against the ends of the projections on the lower belt. The relative oscillatory movement of the rollers may be transmitted through the belts 114 and 115 to their adjacent or contiguous surfaces. As will be seen from consideration of FIG. 28, this relative movement will apply to the fibers lateral translatory components of force acting parallel to the plane of the web, rotational components of force, and vibrational components of force. All these will act to cause individual fibers to move with respect to the other fibers in the layer so that the rearranged fiber segments will remain in mechanical equilibrium.

The upper rollers alone may be oscillated in which case their movement will be distributed and partially absorbed by the resilient material of the web engaging belt 115 in contact therewith. Thus, the amplitude of oscillation of the inner surface 125 of the resilient belt 115 may be considerably less than the corresponding amplitudes of the oscillating rollers. As mentioned hereinbefore, the relative oscillatory motion of the belts may occur in only one direction, however, oscillation in different directions in the plane of the web may be desirable from the standpoint of uniformity. The amplitudes of relative motion between the inner surface 125 of the web engaging belt and the ends of the projections on the hole producing belt should be controlled to prevent damage to the web in the form of excessively large holes or tears, clumps of loose fibers, etc.

It will be seen that in the embodiments of FIGS. 10 through 28, the web engaging belt 115 (and the similar element illustrated in the other figures) applies agitating forces to the web as a whole. These forces are applied generally throughout the entire fibrous layer. The fiber rearranging forces which operate on the layer result from the interaction between these agitating forces and the more specific forces applied by the spaced projections of the aperture defining belt (such as the projections shown in FIGS. 14 to 23) in opposition to the generalized agitating forces.

It is only by the action of some type of opposed forces that a group of fibers can be rearranged into consolidated and parallelized groups of segments. Important though the agitating forces are, they cannot accomplish anything by themselves; nor, indeed, could the spaced projections acting alone. The interaction of the two elements is the essential thing, and that interaction takes place at laterally and longitudinally spaced areas of the web, resulting in the application of fiber rearranging forces at those areas.

When the screening of FIGS. 24 and 25 is employed, an additional resilient belt, not shown, may be employed between the screening and the lower oscillating rollers 118. This additional belt tends to decrease the relative movement between the hole defining projections 106 of the screening and the inner surface 125 of the upper belt and also acts to distribute the oscillatory forces and cushion the impact of these forces upon the screening. However, satisfactory results may be achieved with the screening without the additional resilient belt described above. For instance, good results have been obtained with a web of the type described hereinbefore interposed between a resilient belt of sponge rubber ⅛ inch thick and a hole defining belt of 24 x 20 wire screening of the type generally described above, when the resilient belt and screening are run between upper and lower rollers about 4 inches in diameter at a linear speed of approximately 20 feet per minute while the upper rollers oscillate ⅛ inch both axially and circumferentially at frequencies ranging between 800 and 1,600 cycles per minute. At such speeds a nonwoven fabric according to this invention may be produced during the period the web is in contact with the screening which may be in the neighborhood of 1 to 10 seconds, depending upon the number of rollers employed and the inclination of the resilient belt to the screening.

The base web or layer of starting material may comprise natural fibers, such as fibers of cotton, wood, wool, jute, ramie, or abaca; or artificial fibers of viscose rayon, cuprammonium rayon, cellulose acetate, nylon, Dynel or other materials, alone or in combination with one another. Viscose rayon is known to give excellent results in producing a fabric according to this invention. While relatively long textile-type fibers above normal papermaking lengths and close to normal textile length or over, say of about ¼" to 2" or longer are preferred for textile applications, shorter fibers, below ¼ inch in length, within the paper range, may be used for these and other applications. It is preferred that the shorter papermaking fibers, if used, be unbeaten or substantially unhydrated if a textile-like fabric is desired. In this connection, shorter fibers of woodpulp, for instance, may be mixed with longer fibers with the result that the longer fibers will enhance the strength of the resulting fabric and the shorter fibers will decrease its cost. Fiber length is also an important factor affecting fabric strength, as described hereinbefore, and fiber lengths and materials should be chosen with this and other fabric characteristics in mind.

There are a number of suitable adhesive bonding materials, or binders which may be included in the web prior to, or during, rearrangement. For instance, water softenable materials including the following may be used: beaten cellulose jellies of woodpulp, caroa, ramie, etc.; natural gums including karaya, locust bean, gum arabic and others; starches; and synthetics such as polyvinyl alcohol, carboxymethylcellulose, polyvinyl acetate, etc. Suitable binders, softenable by solvents other than water, are exemplified by polyvinyl chloride and polyvinyl butyral and their copolymers, while nonreversible binders which may be used if rearrangement occurs before they are set, include urea-formaldehyde and melamine-formaldehyde.

Having now described the invention in specific detail and exemplified the manner in which it may be carried into practice, it will be readily apparent to those skilled in the art that innumerable variations, applications, modifications and extensions of the basic principles involved may be made without departing from its spirit or scope. Thus the fabrics of the present invention may be laminated with other fabrics, with paper or with other materials, or employed in a host of ways that will be readily apparent to the skilled artisan.

We claim:

1. The method of producing a nonwoven fabric having spaced holes arranged in a predetermined pattern from a layer of irregularly arranged fibers, which comprises supporting the layer locally to maintain its integrity, by means including spaced projections arranged in accordance with said pattern, subjecting the supported layer at laterally and longitudinally spaced areas corresponding to said predetermined pattern to adjacent, simultaneously applied fiber rearranging forces, said forces moving segments of said fibers from local areas of the layer corresponding to said predetermined pattern into closer proximity and in interlocking and frictional engagement with one another, said layer being supported with sufficient freedom to allow said segments to be moved as aforesaid into mechanical equilibrium in their new positions, whereby a fabric is produced comprising distinct openings arranged substantially in accordance with said pattern.

2. The method of producing a nonwoven fabric having spaced holes arranged in a predetermined pattern from a layer of irregularly arranged fibers, which comprises constraining the layer into contact with the ends of projections arranged in a predetermined pattern having interconnected spaces between them, and maintaining said constraint while imparting movement to the entire layer relative to said projections and substantially in the plane of the layer to move fibers it contains away from the ends of the projections and into the spaces between them.

3. The method of producing a nonwoven fabric having spaced holes arranged in a predetermined pattern from a layer of irregularly arranged fibers, which comprises constraining the layer into contact with the ends of projections arranged in a predetermined pattern having interconnected spaces between them, and maintaining said constraint while imparting substantially oscillatory movement to the entire layer relative to said projections and predominantly in the plane of the layer to move fibers it contains away from the ends of the projections and into the spaces between them.

4. The method of producing a nonwoven fabric having spaced holes arranged in a predetermined pattern from a layer of irregularly arranged fibers which comprises supporting the layer between means comprising projections arranged in a predetermined pattern on one side of said layer and cooperating means on the other side of the layer, said projections having interconnected spaces between them, and moving said cooperating means and said projections relative to one another in the plane of said layer to move fiber segments away from the ends of the projections and into the spaces between them and into closer proximity and in interlocking and frictional engagement with one another whereby a fabric is produced comprising distinct openings arranged substantially in accordance with said pattern.

5. The method of producing a nonwoven fabric having spaced holes arranged in a predetermined pattern from a layer of irregularly arranged fibers which comprises supporting the layer between means comprising projections arranged in a predetermined pattern on one side of said layer and resilient means on the other side of the layer, said projections having interconnected spaces between them, and moving said resilient means relative to said projections in the plane of said layer to move fiber segments away from the ends of the projections and into the spaces between them and into closer proximity and in interlocking and frictional engagement with one another, whereby a fabric is produced comprising distinct openings arranged substantially in accordance with said pattern.

6. The method of producing a nonwoven fabric having spaced holes arranged in a predetermined pattern from a layer of irregularly arranged fibers, which comprises constraining the layer into contact with the ends of projections arranged in a predetermined pattern by means of a resilient member on the opposite side of said layer to said projections, said projections having interconnected spaces between them, and maintaining said constraint while imparting movement to the entire layer substantially in the plane of the layer and relative to the ends of said projections by moving said resilient member with respect to said projections to push fiber segments forming said layer into the spaces between said projections.

7. The method of producing a nonwoven fabric having spaced holes arranged in a predetermined pattern from a layer of irregularly arranged fibers, which comprises constraining the layer into contact with the ends of projections arranged in a predetermined pattern by means of a resilient member on the opposite side of said layer to said projections, said projections having interconnected spaces between them, and maintaining said constraint while imparting movement to the entire layer substantially in the plane of the layer and relative to the ends of said projections by moving said resilient member with respect to said projections, said resilient member protruding slightly into the spaces between the projections to facilitate movement of fibers into said spaces.

8. The method of producing a nonwoven fabric having spaced holes arranged in a predetermined pattern from a layer of irregularly arranged fibers which comprises constraining the layer into contact with the ends of spaced projections defining interconnected grooves between them arranged in a predetermined pattern, and maintaining said constraint while imparting movement to the entire layer relative to said projections and substantially in the plane of the layer to move fibers it contains away from the ends of the projections and into the grooves between them.

9. The method of producing a nonwoven fabric having spaced holes arranged in a predetermined pattern from a layer of irregularly arranged fibers, which comprises wetting the layer, constraining said layer into contact with the ends of projections arranged in a predetermined pattern having interconnected spaces between them, and maintaining said constraint while imparting movement to the entire layer relative to said projections and substantially in the plane of the layer to move fibers it contains away from the ends of the projections and into the spaces between them.

10. The method of producing a nonwoven fabric having spaced holes arranged in a predetermined pattern from a layer of irregularly arranged fibers, said layer including a liquid softenable adhesive binder distributed substantially uniformly therein, which comprises wetting the layer to soften said binder, constraining said layer into contact with the ends of projections arranged in a predetermined pattern having interconnected spaces between them, and maintaining said constraint while imparting movement to the entire layer relative to said projections and substantially in the plane of the layer to move fibers it contains away from the ends of the projections and into the spaces between them.

11. A mechanism for producing a nonwoven fabric having spaced holes arranged in a predetermined regular pattern from a nonwoven fibrous layer having an irregular pattern, said mechanism comprising hole-defining means comprising projections arranged in a predetermined pattern having interconnected spaces between them, layer-engaging means adapted to cooperate with said hole-defining means for continuously confining the layer between them in contact with the ends of said projections, means for constraining said hole-defining means and said layer-engaging means together for confining the layer as aforesaid, and means for moving said hole-defining means and said layer-engaging means with respect to one another substantially in the plane of the layer between them, whereby the fibers in the layer will be moved away from the ends of said projections to produce a fabric having perforations arranged in substantially the same pattern as are the ends of said projections.

12. A mechanism for producing a nonwoven fabric having spaced holes arranged in a predetermined regular pattern from a nonwoven fibrous layer having an irregular pattern, said mechanism comprising hole-defining means comprising projections arranged in a predetermined pattern having interconnected spaces between them, layer-engaging means presenting a resilient surface adapted to cooperate with said hole-defining means for continuously confining the layer between them in contact with the ends of said projections, means for constraining said hole-defining means and said layer-engaging means together for confining the layer as aforesaid, and means for moving said hole-defining means and said layer-engaging means with respect to one another substantially in the plane of the layer between them, whereby the fibers in the layer will be moved away from the ends of said projections to produce a fabric having perforations arranged in substantially the same pattern as are the ends of said projections.

13. A mechanism for producing a nonwoven fabric having spaced holes arranged in a predetermined regular pattern from a nonwoven fibrous layer having an irregular pattern, said mechanism comprising hole-defining means comprising projections arranged in a predetermined pattern having interconnected spaces between them, layer-engaging means adapted to cooperate with said hole-defining means for continuously confining the layer between them in contact with the ends of said projections, means for constraining said hole-defining means and said layer-engaging means together for confining the layer as aforesaid, and means for imparting oscillatory relative movement to said hole-defining means and said layer-engaging means substantially in the plane of the layer between them, whereby the fibers in the layer will be moved away from the ends of said projections to produce a fabric having perforations arranged in substantially the same pattern as are the ends of said projections.

14. Apparatus for producing a nonwoven fabric having spaced holes arranged in a predetermined pattern from a layer of irregularly arranged fibers which comprises means for engaging said layer throughout the area to be affected, the surface of said engaging means having indented portions forming interconnected spaces arranged in a predetermined pattern corresponding to the desired predetermined pattern of the fabric to be produced, fiber rearranging means having a surface generally complementary to the unindented portions of the surface of said engaging means, means for pressing the engaging means and fiber rearranging means together with the fibrous starting layer therebetween, and means for producing relative movement between the engaging means and fiber rearranging means in at least one direction measured in the plane of the starting layer to force the fibers into said patterned spaces and arrange them into interconnected groups of fiber segments in said desired predetermined pattern, said groups being interconnected by fibers common to a plurality of groups, wherein some of the segments in each of said groups are substantially parallel to and consolidated with other segments in the group, wherein substantial segments of individual interconnecting fibers are mechanically engaged with other fiber segments in various groups extending in more than one direction measured in the plane of the fabric, and wherein the fibers in said fabric lie in mechanical engagement with one another and in mechanical equilibrium.

15. A mechanism for producing a nonwoven fabric having spaced holes arranged in a predetermined regular pattern from a nonwoven fibrous layer having an irregular pattern, said mechanism comprising a hole-defining belt having projections arranged in a predetermined pattern having interconnected spaces between them, a layer-engaging belt adapted to cooperate with said hole-defining belt for supporting the layer between them in contact with the ends of said projections, rollers spaced to allow said belts and said layer to be passed between them in superimposed relationship, said rollers being spaced to constrain said belts together and being adapted for relative oscillatory movement, whereby said rollers may be oscillated with respect to one another to impart relative oscillatory movement to the projections on the hole-defining belt and the corresponding inner surface of the layer-engaging belt.

16. The method of producing a nonwoven fabric having spaced holes arranged in a predetermined pattern from a layer of irregularly arranged, overlapping fibers in frictional engagement with one another, said fibers being capable of movement in response to applied rearranging forces, which comprises supporting the layer locally throughout the area to be affected to maintain its integrity; while the layer is so supported subjecting the same to fiber rearranging forces comprising forces having translatory components of force acting parallel to the plane of the layer and other cooperating components of force selected from the group consisting of rotational components, vibrational components, and both rotational and vibrational components, said fiber rearranging forces being applied to fibers of the layer at laterally and longitudinally spaced areas corresponding to said predetermined pattern, adjacent translatory components of said rearranging forces being applied simultaneously in opposed directions to fiber groups lying between the respective areas of application of said components, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant translatory forces acting parallel to the plane of the fibrous layer.

17. The method of producing a nonwoven fabric having spaced holes arranged in a predetermined pattern from a layer of irregularly arranged, overlapping fibers in frictional engagement with one another, said fibers being capable of movement in response to applied rearranging forces, which comprises supporting the layer locally throughout the area to be affected to maintain its integrity; while the layer is so supported subjecting the same to fiber rearranging forces comprising forces having translatory components of force acting parallel to the plane of the layer and other cooperating components of force selected from the group consisting of rotational components, vibrational components, and both rotational and vibrational components, said fiber rearranging forces being applied to fibers of the layer at laterally and longitudinally spaced areas corresponding to said predetermined pattern, adjacent translatory components of said rearranging forces being applied simultaneously in opposed directions to fiber groups lying between the respective areas of application of said components, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in quiescent fiber accumulating zones arranged in an interconnected pattern substantially complementary to said predetermined pattern of holes, said zones being substantially free of any resultant forces acting upon the fibers accumulated therein.

18. The method of producing a nonwoven fabric having spaced holes arranged in a predetermined pattern from a layer of irregularly arranged, overlapping fibers in frictional engagement with one another, said fibers being capable of movement in response to applied rearranging forces, which comprises supporting the layer locally throughout the area to be affected to maintain its integrity; while the layer is so supported subjecting the same to mechanical rearranging forces comprising forces having translatory components of force acting parallel to the plane of the layer and other cooperating components of force selected from the group consisting of rotational components, vibrational components, and both rotational and vibrational components, said fiber rearranging forces being applied to fibers of the layer at laterally and longitudinally spaced areas corresponding to said predetermined pattern, adjacent translatory components of said rearranging forces being applied simultaneously in opposed directions to fiber groups lying between the respective areas of application of said components, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any translatory forces acting parallel to the plane of the fibrous layer.

19. The method of producing a nonwoven fabric having spaced holes arranged in a predetermined pattern from a layer of irregularly arranged, overlapping fibers in frictional engagement with one another, said fibers being capable of movement in response to applied rearranging forces, which comprises supporting the layer locally throughout the area to be affected to maintain its integrity; while the layer is so supported subjecting the same to fiber rearranging forces comprising forces having translatory components of force acting parallel to the plane of the layer and other cooperating components of force selected from the group consisting of rotational components, vibrational components, and both rotational and vibrational components, said fiber rearranging forces being applied to fibers of the layer at laterally and longitudinally spaced areas corresponding to said predetermined pattern, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant translatory forces acting parallel to the plane of the fibrous layer.

20. The method of producing a nonwoven fabric having spaced holes arranged in a predetermined pattern from a layer of irregularly arranged, overlapping fibers in frictional engagement with one another, said fibers being capable of movement in response to applied rearranging forces, which comprises supporting the layer locally throughout the area to be affected to maintain its integrity; while the layer is so supported moving segments of fibers in said layer sideways from areas of the layer spaced laterally and longitudinally from each other into closer proximity to and increased parallelism with segments of adjacent fibers lying between said spaced areas by applying to the fibers external rearranging forces comprising forces having lateral translatory components of force acting parallel to the plane of the layer and other cooperating components of force selected from the group consisting of rotational components, vibrational components, and both rotational and vibrational components; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant translatory forces acting parallel to the plane of the fibrous layer.

21. The method of producing a nonwoven fabric having spaced holes arranged in a predetermined pattern from a layer of irregularly arranged, overlapping fibers in frictional engagement with one another, said fibers being capable of movement in response to applied rearranging forces, which comprises supporting the layer locally throughout the area to be affected to maintain its integrity; while the layer is so supported moving segments of fibers in said layer sideways from areas of the layer spaced laterally and longitudinally from each other into closer proximity to and increased parallelism with segments of adjacent fibers lying between said spaced areas by applying to the fibers mechanical rearranging forces comprising forces having lateral translatory components of force acting parallel to the plane of the layer and other cooperating components of force selected from the group consisting of rotational components, vibrational components, and both rotational and vibrational components; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any translatory forces acting parallel to the plane of the fibrous layer.

22. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported moving segments of fibers in said layer sideways from areas of the layer spaced laterally and longitudinally from each other into closer proximity to and increased parallelism with segments of adjacent fibers lying between said spaced areas by applying to the fibers external rearranging forces comprising forces having lateral translatory components of force acting parallel to the plane of the layer and other cooperating components of force selected from the group consisting of rotational components, vibrational components, and both rotational and vibrational components; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant translatory forces acting parallel to the plane of the fibrous layer.

23. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported moving segments of fibers in said layer sideways from areas of the layer spaced laterally and longitudinally from each other into closer proximity to and increased parallelism with segments of adjacent fibers lying between said spaced areas by applying to the fibers mechanical rearranging forces comprising forces having lateral translatory components of force acting parallel to the plane of the layer and other cooperating components of force selected from the group consisting of rotational components, vibrational components, and both rotational and vibrational components; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any translatory forces acting parallel to the plane of the fibrous layer.

24. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported subjecting the same to fiber rearranging forces comprising forces having translatory components of force acting parallel to the plane of the layer and cooperating components of force selected from the group consisting of rotational components, vibrational components, and both rotational and vibrational components, said fiber rearranging forces being applied to fibers of the layer at laterally and longitudinally spaced areas corresponding to said predetermined pattern, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant translatory forces acting parallel to the plane of the fibrous layer.

25. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported subjecting the same to fiber rearranging forces comprising forces having translatory components of force acting parallel to the plane of the layer and other cooperating components of force selected from the group consisting of rotational components, vibrational components and both rotational and vibrational components, said fiber rearranging forces being applied to fibers of the layer at laterally and longitudinally spaced areas corresponding to said predetermined pattern, adjacent translatory components of said rearranging forces being applied simultaneously in opposed directions to fiber groups lying between the respective areas of application of said components, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant translatory forces acting parallel to the plane of the fibrous layer.

26. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported subjecting the same to fiber rearranging forces comprising forces having translatory components of force acting parallel to the plane of the layer and other cooperating components of force selected from the group consisting of rotational components, vibrational components and both rotational and vibrational components, said fiber rearranging forces being applied to fibers of the layer at laterally and longitudinally spaced areas corresponding to said predetermined pattern, adjacent translatory components of said rearranging forces being applied simultaneously in opposed directions to fiber groups lying between the respective areas of application of said components, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any resultant forces acting upon the fibers accumulated therein.

27. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported subjecting the same to mechanical rearranging forces comprising forces having translatory components of force acting parallel to the plane of the layer and other cooperating components of force selected from the group consisting of rotational components, vibrational components and both rotational and vibrational components, said fiber rearranging forces being applied to fibers of the layer at laterally and longitudinally spaced areas corresponding to said predetermined pattern, adjacent translatory components of said rearranging forces being applied simultaneously in opposed directions to fiber groups lying between the respective areas of application of said components, to move segments of fibers in said layer sideways from the areas to which said rearranging forces are applied into closer proximity to and increased parallelism with segments of adjacent fibers lying between said areas; at the same time moving individual fiber segments, by application of said translatory and cooperating components of force, with respect to other fibers in the layer with which they overlap and are frictionally engaged so as to bring any segment of said individual fibers so moved into mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any translatory forces acting parallel to the plane of the fibrous layer.

28. The method of producing a nonwoven fabric having spaced holes arranged in a predetermined pattern from a layer of irregularly arranged, frictionally engaged fibers which comprises supporting said layer locally throughout the area to be affected to maintain its integrity, applying external agitating forces to substantially the entire area of said fibrous layer to move fibers it contains generally in the plane of said layer, and constraining the resulting fiber movement at intervals spaced laterally and longitudinally across said layer in a predetermined pattern, whereby a fabric may be produced comprising fibers rearranged into groups of fiber segments defining an arrangement of holes corresponding to said predetermined pattern of constraint.

29. The method of producing a nonwoven fabric having spaced holes arranged in a predetermined pattern from a layer of irregularly arranged, frictionally engaged fibers which comprises supporting said layer locally throughout the area to be affected to maintain its integrity, applying external mechanical agitating forces to substantially the entire area of said fibrous layer to move fibers it contains generally in the plane of said layer, and constraining the resulting fiber movement at intervals spaced laterally and longitudinally across said layer in a predetermined pattern, whereby a fabric may be produced comprising fibers rearranged into groups of fiber segments defining an arrangement of holes corresponding to said predetermined pattern of constraint.

30. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported moving segments of fibers in said layer sideways from areas of the layer spaced laterally and longitudinally from each other into closer proximity to and increased parallelism with segments of adjacent fibers lying between said spaced areas by applying to the fibers external rearranging forces comprising forces having lateral translatory components of force acting parallel to the plane of the layer and cooperating vibrational components of force; at the same time moving individual fiber segments, by application of said translatory and cooperating components of force, with respect to other fibers in the layer with which they overlap and are frictionally engaged so as to permit a segment of any of said individual fibers to remain in mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any translatory forces acting parallel to the plane of the fibrous layer.

31. The method of producing a nonwoven fabric having spaced holes arranged in a predetermined pattern from a wetted layer of irregularly arranged, overlapping fibers in frictional engagement with one another, said fibers being capable of movement in response to applied rearranging forces, which comprises supporting the wetted layer locally throughout the area to be affected to maintain its integrity; while the layer is so supported moving segments of fibers in said layer sideways from areas of the layer spaced laterally and longitudinally from each other into closer proximity to and increased parallelism with segments of adjacent fibers lying between said spaced areas by applying to the fibers external rearranging forces comprising forces having lateral translatory components of force acting parallel to the plane of the layer and cooperating components of force, at least one of said forces being applied repetitively; at the same time moving individual fiber segments, by application of said translatory and cooperating components of force, with respect to other fibers in the layer with which they overlap and are frictionally engaged so as to permit a segment of any of said individual fibers to remain in mechanical equilibrium in the most extreme lateral position into which it is moved by said fiber rearranging forces; and grouping the aforesaid fiber segments in fiber accumulating zones arranged in an interconnected pattern substantially complementary to said predetermined pattern of holes, said zones being substantially free of any translatory forces acting parallel to the plane of the fibrous layer.

References Cited in the file of this patent

UNITED STATES PATENTS

| | | |
|---|---|---|
| 720,857 | Tourigny | Feb. 17, 1903 |
| 728,804 | Lindberg | May 19, 1903 |
| 795,719 | Motz | July 25, 1905 |
| 995,602 | Howes | June 20, 1911 |
| 1,447,708 | Caffrey | Mar. 6, 1923 |
| 1,453,575 | Tong et al. | May 1, 1923 |
| 1,533,351 | Genest | Apr. 14, 1925 |
| 1,834,913 | Genest | Dec. 1, 1931 |
| 1,882,599 | Hodshon | Oct. 11, 1932 |
| 1,883,526 | Bryan | Oct. 18, 1932 |
| 1,978,620 | Brewster | Oct. 30, 1934 |
| 1,989,435 | Wallquist | Jan. 29, 1935 |
| 2,093,709 | Cassé | Sept. 27, 1937 |
| 2,302,020 | Frederick | Nov. 17, 1942 |
| 2,441,390 | Boeddinghaus | May 11, 1948 |
| 2,506,855 | Cassé | May 9, 1950 |
| 2,697,678 | Ness et al. | Dec. 21, 1954 |
| 2,722,868 | Harshberger | Nov. 8, 1955 |
| 2,771,363 | Fish | Nov. 20, 1956 |

FOREIGN PATENTS

| | | |
|---|---|---|
| 116,987 | Japan | Aug. 17, 1936 |
| 120,565 | Japan | June 2, 1937 |
| 131,851 | Japan | Aug. 25, 1939 |
| 422,226 | Great Britain | Jan. 8, 1935 |
| 468,106 | Great Britain | June 29, 1937 |

OTHER REFERENCES

"Handmade Papers of Japan," T. K. and R. H. Tindale, Charles E. Tuttle Co., Rutland, Vt., and Tokyo, Japan. (Printed in Tokyo in 1952.)

Matthews' Textile Fibers, 5th edition, John Wiley and Sons, Inc., New York, 1947 (pages 765–772). Du Pont Technical Bulletin X-142, September 1961.

UNITED STATES PATENT OFFICE
CERTIFICATE OF CORRECTION

Patent No. 3,081,500                                March 19, 1963

Hector W. Griswold et al.

It is hereby certified that error appears in the above numbered patent requiring correction and that the said Letters Patent should read as corrected below.

Column 6, line 16, for "firctional" read --- frictional ---; column 22, line 13, for "overlay" read --- overlap ---.

Signed and sealed this 1st day of October 1963.

(SEAL)
Attest:

ERNEST W. SWIDER
Attesting Officer

DAVID L. LADD
Commissioner of Patents